(12) United States Patent
Pubben et al.

(10) Patent No.: US 6,254,057 B1
(45) Date of Patent: Jul. 3, 2001

(54) VALVE CONTROL SYSTEM

(75) Inventors: Peter Pubben, Calgary; Scott Phillips, Victoria; Sandeep Munshi, Vancouver, all of (CA)

(73) Assignee: Integra Dynamics Inc., Calgary ( * ) Notice: Subject to any disclaimer, the term of this patent is extended or adjusted under 35 U.S.C. 154(b) by 0 days.

(21) Appl. No.: 09/178,082

(22) Filed: Oct. 22, 1998

(51) Int. Cl.$^7$ ................................................ F16K 31/128
(52) U.S. Cl. ............................. 251/45; 251/34; 251/46; 251/61.1; 251/333; 137/625.25
(58) Field of Search .................... 251/33, 34, 45, 251/46, 333, 61.1; 137/596.2, 625.25, 625.27; 257/25

(56) References Cited

U.S. PATENT DOCUMENTS

| | | | |
|---|---|---|---|
| 1,521,355 | * | 12/1924 | Burns ........................................ 251/45 |
| 1,672,366 | * | 6/1928 | Cadwell et al. ..................... 251/45 X |
| 1,964,921 | * | 7/1934 | Lundberg ............................ 251/45 X |
| 2,868,492 | * | 1/1959 | Volcov et al. ........................... 251/46 |
| 2,877,791 | * | 3/1959 | Rich ..................................... 251/45 X |
| 3,282,556 | * | 11/1966 | Hancook ............................. 251/45 X |
| 3,379,406 | * | 4/1968 | Greer ...................................... 251/45 |
| 3,456,883 | * | 7/1969 | Wardrup .............................. 251/25 X |
| 3,495,804 | * | 2/1970 | Muller et al. ....................... 251/45 X |
| 3,502,297 | * | 3/1970 | Wardrup .................................. 251/25 |
| 4,206,901 | * | 6/1980 | Williams ............................. 251/46 X |
| 4,221,361 | * | 9/1980 | Weingarten ...................... 251/61.1 X |
| 4,280,680 | * | 7/1981 | Payne ............................. 251/335.2 X |
| 4,715,578 | * | 12/1987 | Seltzer .................................... 251/25 |
| 5,213,303 | * | 5/1993 | Walker ............................. 251/30.02 |
| 5,427,350 | * | 6/1995 | Rinkewich ........................ 251/30.01 |

* cited by examiner

*Primary Examiner*—Kevin Shaver
*Assistant Examiner*—John Bastuanelli
(74) *Attorney, Agent, or Firm*—Oyen Wiggs Green & Mutala

(57) ABSTRACT

A fluid control valve has a valve member which, on closing creates a stagnation zone between the valve member and a surface within the valve. In the stagnation zone fluid pressure is greater than it is in an adjacent constriction zone. This causes the valve to close slowly, thereby reducing the likelihood that water hammer will occur on closure of the valve. The design of the valve member also reduces resonances which can cause annoying noises and premature wear. A flow restriction chamber further slows closure of the valve. The fluid control valve may be controlled by a conventional 3-way pilot valve. Preferably the fluid control valve is used with a pilot valve according to the invention having a rocker member which, on actuation, first closes an inlet valve member and then opens an outlet valve member. The pilot valve may be used in other situations where a 3-way valve is needed.

40 Claims, 14 Drawing Sheets

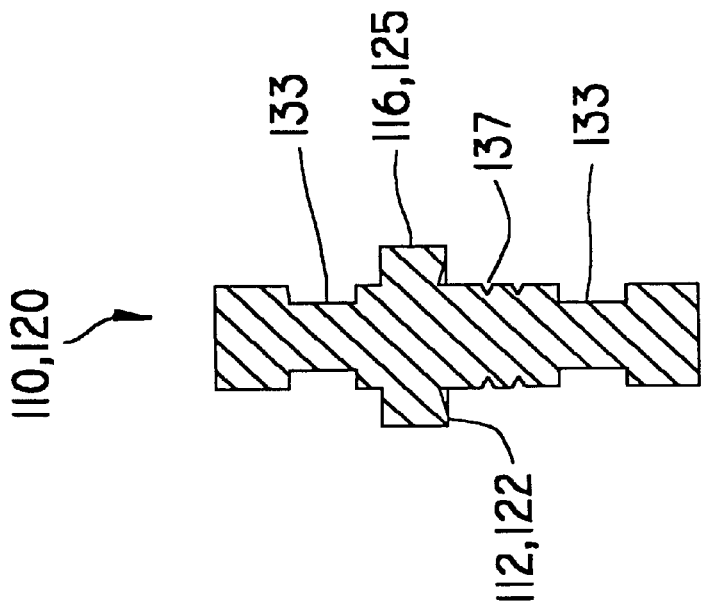
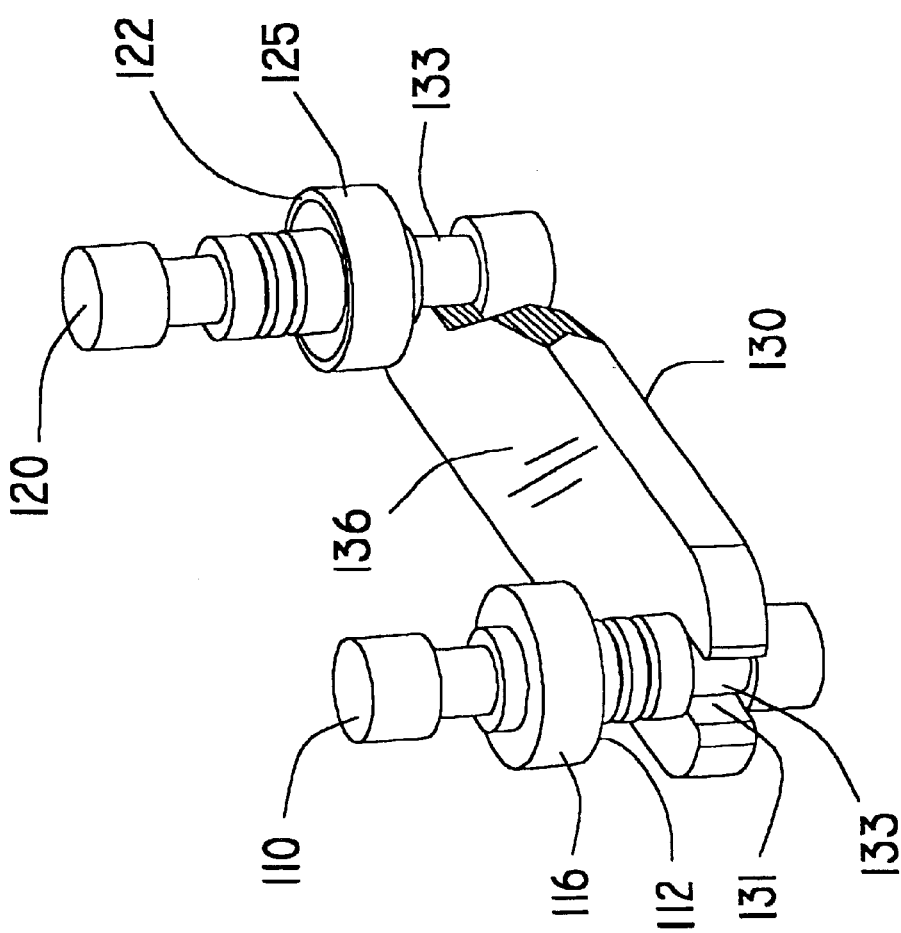
FIG 11B
FIG 11A

VALVE CONTROL SYSTEM

FIELD OF THE INVENTION

This invention relates to valves for controlling flows of fluids. More particularly the invention relates to valves for use in systems in which a valve member is controlled to turn on or off a main fluid flow by fluid at a control port. The invention also relates to a control valve, or "pilot" valve, for use in controlling another valve. The invention has particular application in controlling the supply of water to faucets. Preferred embodiments of the invention provide "hands free" control of faucets.

BACKGROUND OF THE INVENTION

Pubben, U.S. Pat. No. 5,505,227, discloses a "hands free" system for controlling the flow of water to a faucet. The system includes a pilot valve which provides pilot water of controlled pressure to operate diaphragm valves in a control block. The valves in the control block may be respectively connected between hot and cold water supply lines and a faucet. The pilot valve may be located in a position where it can be operated by a user's knee, elbow or foot.

Key advantages of a system of this general type are that a user does not need to touch any valve by hand. Therefore such valves can be operated hygienically. For this reason, hands free valve systems have become widely used by health professionals such as dentists and doctors. Such systems also have the advantage that no electrical power or compressed air is needed for operation.

Although the Pubben system is very effective and has had significant commercial success there are some areas where it could usefully be improved. In particular, it has been observed that flow resonances may occur when the Pubben valve opens or closes. This can cause the system to make undesirable noises. Such resonances may continue for one second, or more, in some cases. The resonances can be exacerbated if the pilot valve has an intermediate position in which its output is simultaneously connected to both lower and higher pressure fluid supplies.

Further, the valve tends to close rather suddenly which precipitates water hammer. Water hammer is caused by the sudden stopping of a moving water column and results in high amplitude pressure waves which can bounce back and forth in plumbing pipes causing unpleasant noises and accelerating wear of the valve. After several years of use the wear caused by water hammer and valve resonances can cause the diaphragms in the valve block to become perforated, especially in their areas around the valve exit ports. Finally, the 3-way sliding spindle valves which are commonly used as pilot valves have seals which can wear undesirably rapidly.

Austin Jr. et al., U.S. Pat. No. 5,203,373 discloses another hands free faucet system. The Austin et al. system also uses pilot valves to control the flow of water through a pair of main valves. Austin Jr. et al. does not appear to provide any mechanism for reducing or eliminating water hammer and resonance effects. The inventors therefore are of the view that the Austin Jr. et al. valve system suffers from the same defects identified above.

SUMMARY OF THE INVENTION

This invention provides a fluid control valve having novel features which may be used in a system for controlling the flow of fluids. The fluid control valve may be used, for example, to control the flow of water from a water faucet. The fluid control valve can be controlled by a pilot valve. The invention also provides a pilot valve which may be used either with the fluid control valve of the invention or in other settings.

Accordingly, one aspect of the invention provides a fluid control valve comprising: a body having an inlet, an outlet and a fluid path extending between the inlet and the outlet; a chamber in the body the chamber in fluid communication with a control port; a valve member movably disposed within the body for free motion toward or away from a valve seat along a trajectory, the valve member having a closed position wherein the valve member is sealed against the valve seat and the fluid path is blocked by the valve member and an open position wherein the fluid path is not blocked by the valve member, the valve member movable toward the closed position along the trajectory by increasing a fluid pressure within the chamber. When the valve member is in an intermediate position between its open and closed positions, the fluid path extends through a constriction zone between the body and a surface on the valve member which is oriented substantially parallel to the trajectory. The fluid path also extends through a stagnation zone between the body and a surface on the valve member which extends transversely to the trajectory. The fluid velocity in the stagnation zone is less than the fluid velocity in the constriction zone. Consequently, the fluid pressure is greater in the stagnation zone than it is in the constriction zone. The increased fluid pressure tends to slow closure of the valve.

In preferred embodiments the constriction zone is annular. Preferably the valve comprises a diaphragm and the valve member is on the diaphragm.

The valve may include a plug portion on the valve member. The plug portion is received in an aperture in a valve seat. In preferred embodiments an end portion of the plug has a conical configuration. Most preferably the end portion of the plug has a cone angle in the range of 30 to 60 degrees.

Some embodiments of the invention include filter in the fluid path. The filter may be an annular filter located in an annular chamber surrounding the valve seat structure.

Some embodiments of the invention include a flow restriction chamber. The flow restriction chamber provides resistance to the flow of fluid but can have internal dimensions larger than an orifice sized to provide the same resistance. Consequently the flow restriction chamber is less susceptible to becoming obstructed by solid particles or deposits than would be a simple orifice. The flow restriction chamber comprises a substantially tangential inlet in a peripheral portion of the chamber and an outlet in a central portion of the flow restriction chamber. The flow restriction chamber inlet is in fluid communication with the valve inlet. The outlet capable of being placed in fluid communication with the chamber in the body of the valve. In preferred embodiments, the flow restriction chamber is substantially conical, the flow restriction chamber inlet is near a base portion of the flow restriction chamber and the flow restriction chamber outlet is in an apex portion of the flow restriction chamber. Most preferably the flow restriction chamber comprises a conical insert portion extending axially into the flow restriction chamber from the base portion.

Another aspect of the invention combines the valve with a 3-way pilot valve, the pilot valve having an inlet port communicating with the fluid control valve inlet through a pilot fluid path, an outlet port in fluid communication with the fluid control valve outlet, and a pilot port in fluid communication with the control port of the fluid control valve, the pilot valve having a first configuration wherein its inlet and pilot ports are in fluid communication and a second configuration wherein its outlet and pilot ports are in fluid communication.

In preferred embodiments the valve comprises a filter located in the fluid path and in the pilot fluid path. The fluid path passes through larger passages extending in a first direction in the filter and the pilot fluid path passes through smaller passages extending in a second direction through the filter. Most preferably the filter comprises an annular filter located in an annular chamber in the valve body, the first direction is a substantially axial direction and the second direction is a substantially radial direction.

The pilot valve may comprise a body (which may be part of the valve body or a separate body), a first valve member movably disposed within the body, the first valve member having an open position wherein the inlet and pilot ports are in fluid communication and a closed position wherein the inlet and pilot ports are not in fluid communication, the first valve member arranged so that it is held in its closed position when a fluid pressure at the inlet port is higher than a fluid pressure at the pilot port; a second valve member movably disposed within the body, the second valve member having an open position wherein the outlet and pilot ports are in fluid communication and a closed position wherein the outlet and pilot ports are not in fluid communication the second valve member arranged so that it is held in its closed position when a fluid pressure at the pilot port is higher than a fluid pressure at the outlet port; a rocker arm in the body; a spring biasing the rocker arm against the first and second valve members, the spring holding the rocker arm in a position wherein the first valve member is in its open position and the second valve member is in its closed position; and, an operating member for displacing the rocker arm into a position wherein the first valve member is in its closed position and the second valve member is in its open position. The pilot valve may be used on its own, in combination with a valve according to the invention or in combination with other valves or fluidic devices.

Another aspect of the invention provides a valve, generally as described above, in combination with a two-way pilot valve connecting the chamber and the outlet. The pilot valve has an open state wherein the chamber is in fluid communication with the outlet through the pilot valve and a closed state wherein fluid cannot freely flow from the chamber to the outlet. The valve comprises a pilot fluid passage communicating between the chamber and the inlet. The pilot fluid passage providing significantly more restriction to fluid flow than does the pilot valve in its open state.

Still another aspect of the invention provides a valve comprising: a valve body having an inlet, an outlet, a valve seat structure between the inlet and the outlet and fluid path extending between the inlet and the outlet through an aperture in the valve seat structure, the valve seat structure comprising generally cylindrical inner and outer walls and an annular valve seating surface; a diaphragm comprising a movable valve member portion, the valve member portion located between the valve seat structure and a cavity in the housing, the valve member portion comprising an annular groove capable of receiving the valve seating surface; and, a fluid passage in the body through which fluid may be introduced to the chamber to vary a fluid pressure within the cavity. The valve member portion has a closed position wherein fluid flow along the fluid path is blocked by the valve member portion, an open position wherein fluid can flow along the fluid path from the input to the output, and an intermediate position between the open and closed positions.

In the intermediate position a first constriction zone in the fluid path is defined between the inner wall of the valve seat structure and an inner wall of the groove, a second constriction zone in the fluid path is defined between the outer wall of the valve seat structure and an outer wall of the groove, and a stagnation zone is defined in the groove adjacent the valve seating surface. A cross sectional area of the fluid path is significantly greater in the stagnation zone than in either of the first and second constriction zones.

Yet another aspect of the invention provides a method for operating a 3-way pilot valve. The method comprises: providing a pilot valve having 1) a valve body; 2) a first valve member movably disposed within the body, the first valve member having an open position wherein the inlet and pilot ports are in fluid communication and a closed position wherein the inlet and pilot ports are not in fluid communication, the first valve member arranged so that it is held in its closed position when a fluid pressure at the inlet port is higher than a fluid pressure at the pilot port; 3) a second valve member movably disposed within the body, the second valve member having an open position wherein the outlet and pilot ports are in fluid communication and a closed position wherein the outlet and pilot ports are not in fluid communication the second valve member arranged so that it is held in its closed position when a fluid pressure at the pilot port is higher than a fluid pressure at the outlet port; and, 4) a rocker arm engaged with the first and second valve members. The method further includes: applying fluid at a higher pressure to the inlet port and applying fluid at a lower pressure to the outlet port; biasing the rocker arm against the first and second valve members to hold the first valve member in its open position and the second valve member in its closed position; displacing the rocker arm to allow the first valve member to move to its closed position while a pressure differential across the second valve member prevents the second valve member from moving to its open position; and, continuing to displace the rocker arm after the first valve member has reached its closed position until the second valve member is displaced to its open position.

Further features and advantages of the invention are described in the following description which highlights specific embodiments of the invention.

BRIEF DESCRIPTION OF THE DRAWINGS

In drawings which illustrate specific embodiments of the invention, but which should not be construed as restricting the spirit or scope of the invention in any way:

FIG. 11A shows a detail view of the rocker and spindles;

FIG. 11B shows a cross section of a spindle; and,

DETAILED DESCRIPTION

Prior Art

Figure 1:
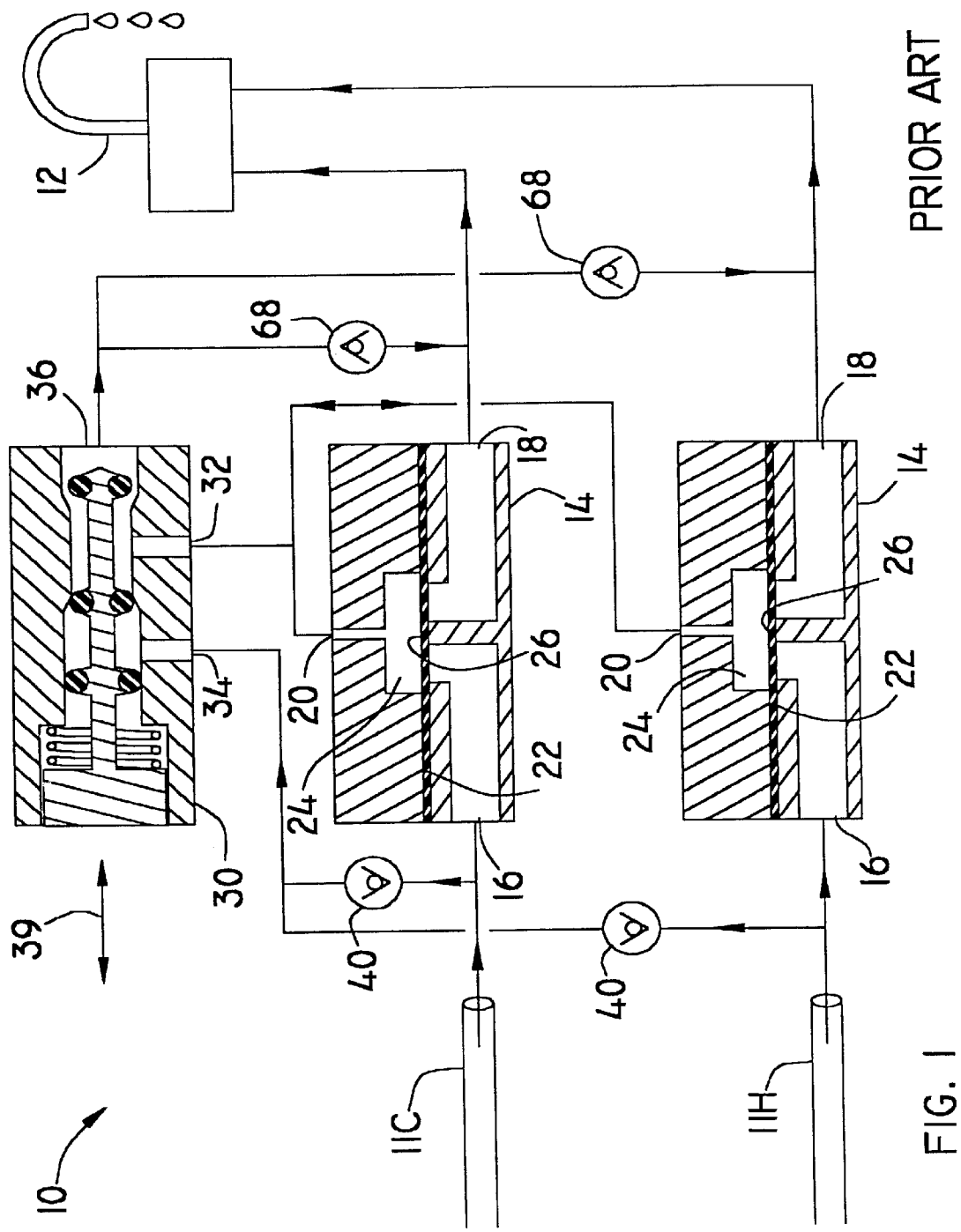
FIG. 1 is a schematic view of a prior art arrangement for controlling the flow of water through a faucet.

FIG. 1 is a schematic view of a prior art system 10 for s controlling a flow of water from cold and hot mains 11C and 11H to a faucet 12. System 10 includes a pair of diaphragm valves 14. Each diaphragm valve 14 comprises an inlet port 16, an outlet port 18 and a control port 20. A diaphragm 22 controls the flow of fluid through each valve 14. Control port 20 is coupled to a chamber 24 on one side of diaphragm 22. When pressure in chamber 24 is high then diaphragm 22 is forced against a valve seat 26 and valve 14 is closed. When pressure in chamber 24 is low then the fluid at inlet 16 is under sufficient pressure to move diaphragm 22 off of valve seat 26 and fluid can flow through valve 14 to outlet 18 between valve seat 26 and diaphragm 22.

The pressure in chamber 24 is controlled by a pilot valve 30. Pilot valve 30 has a pilot port 32 (which is in fluid communication with control ports 20 of valves 14), an inlet port 34 connected to mains 11C and 11H, and an outlet port 36 connected to the output ports 18 of valves 14. A valve member 38 is movable, as indicated by arrow 39 to allow pilot port 32 to be connected either to inlet port 34 or outlet port 36. Check valves 40 are provided to prevent any cross-flow of fluid between mains 11C and 11H. Mains 11C and 11H are typically cold and hot water mains. Check valves 68 are provided to prevent cross flow of fluid between the outlets 18 of valves 14.

When pilot port 32 is connected to inlet port 34 then chambers 24 of valves 14 are at the pressure of mains 11C and 11H and valves 14 are closed. If mains 11C and 11H do not have equal pressures then the pressure in chambers 24 is the pressure of the higher pressure one of mains 11C and 11H. When pilot port 32 is connected to outlet port 36 then the pressure inside chambers 24 is low and fluid can flow through valves 14 to faucet 12.

As noted above, one problem experienced by systems like system 10 is that valves 14 can create water hammers if they close too quickly. Another problem is that diaphragm 22 can resonate against valve seat 26 as a valve 14 opens or closes. By measuring the pressure in the chamber 24 of a prior art valve 14 of the type shown in Pubben, U.S. Pat. No. 5,505,227 the inventors have determined that resonation of diaphragm 22 tends to be accompanied by a sudden reduction of fluid pressure in control chamber 24 at the moment of closure. This indicates that a likely reason for the resonance is that as valve 14 is closed there is a point at which diaphragm 22 is sucked against its valve seat 26 (as opposed to being pushed against valve seat 26 by the pressure of fluid in control chamber 24). After diaphragm 22 contacts seat 26 then, under some operating conditions diaphragm 22 can be lifted off of seat 26 again. The process may repeat rapidly for up to and even exceeding one second.

This Invention

A. Diaphragm Valve

Figure 2:
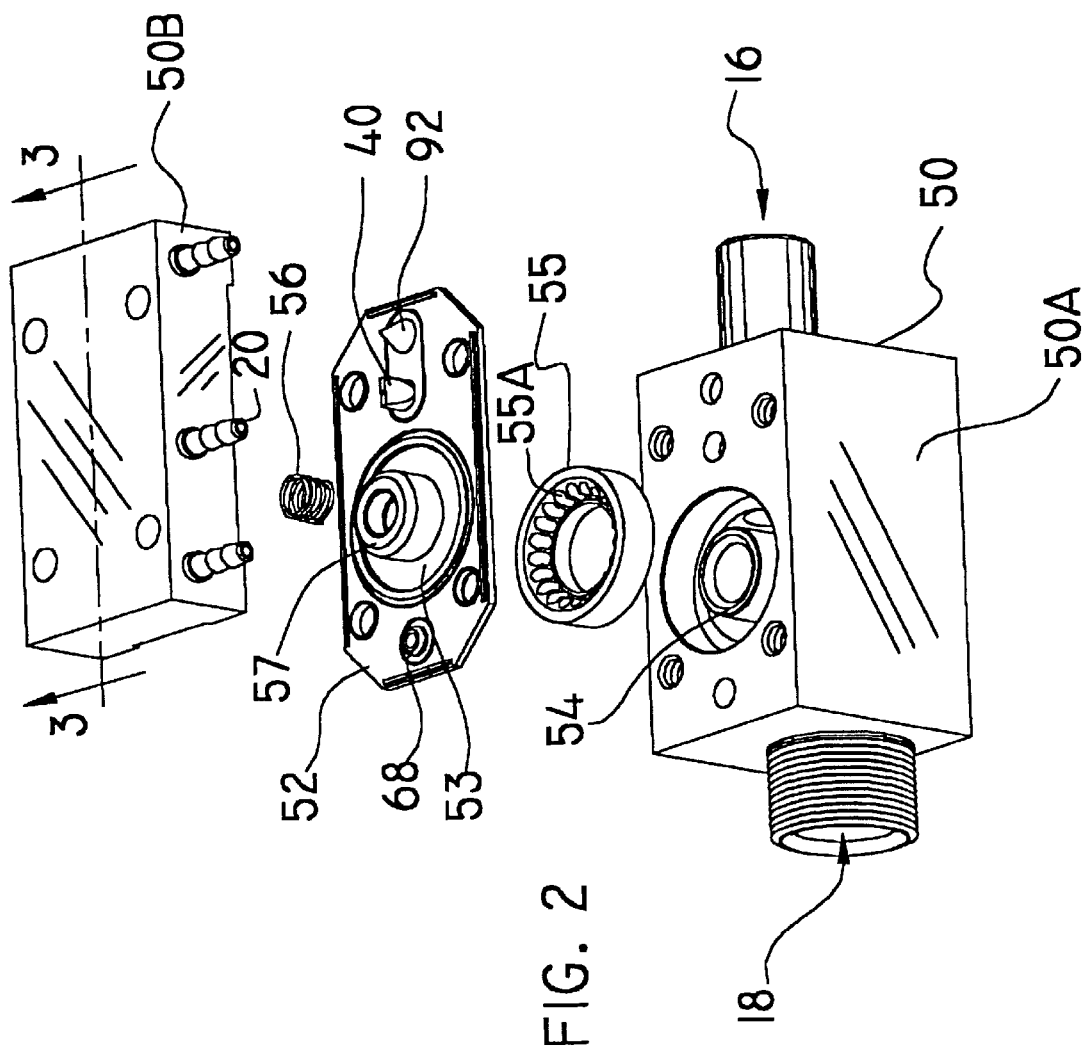
FIG. 2 is an exploded view of a diaphragm valve according to the invention.
Figure 3A:
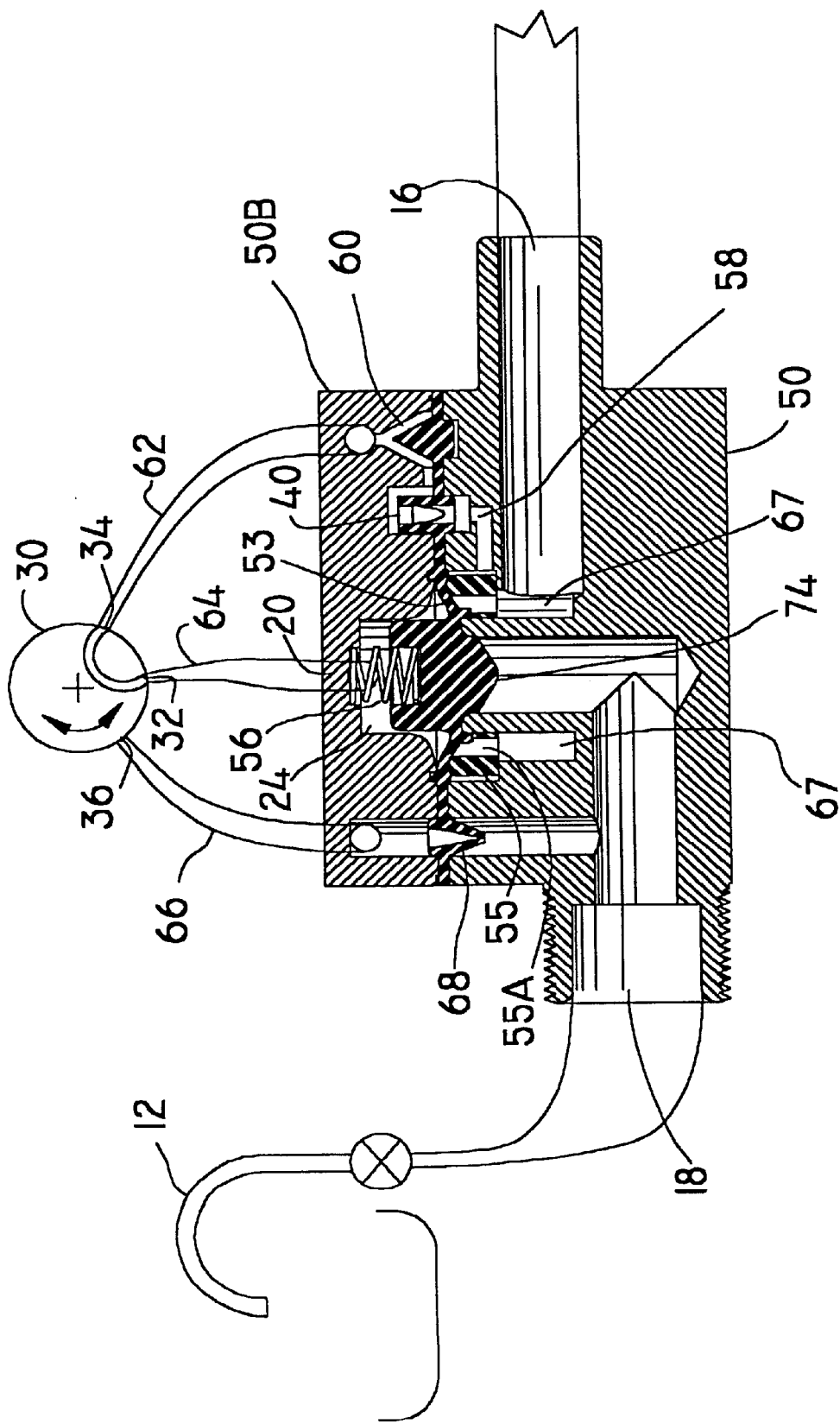
FIGS. 3A and 3B are respectively sections through a diaphragm valve according to the invention coupled to a schematically illustrated pilot valve in closed and open configurations.
Figure 3B:
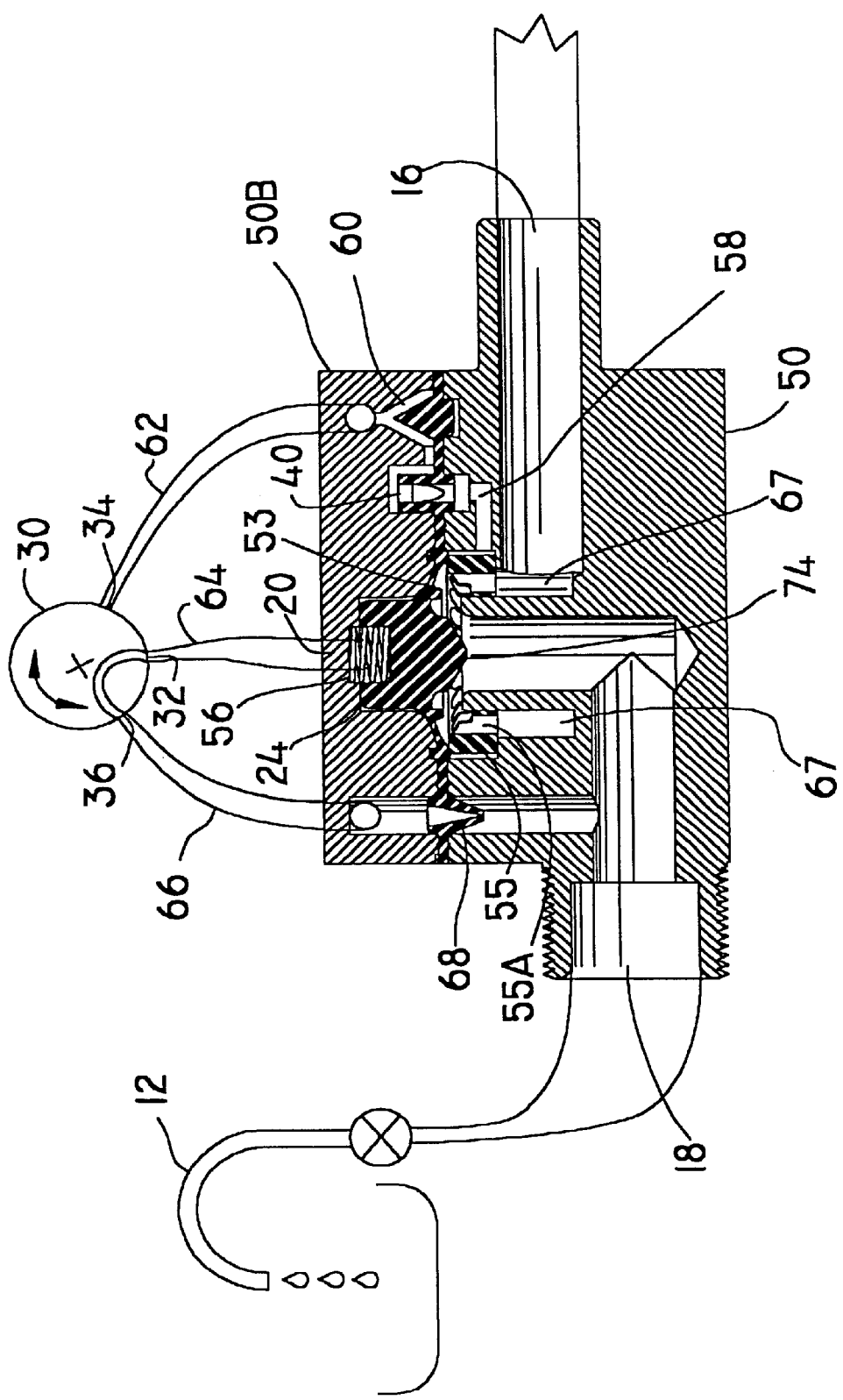

FIGS. 2, 3A, and 3B show a diaphragm valve 50 according to the invention. Valve 50 may be used, for example, in place of a prior art valve 14 in system 10 of FIG. 1. Valve 50 is designed to reduce the occurrence of water hammer and resonances on valve closing.

As best seen in FIG. 3A, valve 50 has a fluid inlet 16, a fluid outlet 18 and a control port 20. Control port 20 is connected to a control chamber 24. One side of chamber 24 is formed by a diaphragm 52 (FIG. 2) which has a central portion, indicated generally by 51. The central portion, may also be called a "valve member" portion and is capable of sealing against an annular valve seat 54C (FIG. 4) on a valve seat structure 54. Central portion 51 is a particular example of a movable "valve member".

Diaphragm 52 has a flexible portion 53 surrounding its central portion 51. Flexible portion 53 allows central portion 51 to travel on an axial trajectory relative to valve seat 54C between an open position in which fluid can flow from inlet 16 to outlet 18 along a fluid path which extends from inlet 16 to outlet 18 between central portion 51 and valve seat structure 54 and a closed position wherein fluid flow along the path is blocked by central portion 51.

A bias means, which comprises a coil spring 56 in the illustrated embodiment, biases diaphragm 52 toward its closed position in which central portion 51 seals against valve seat 54C. Spring 56 is located within a cylindrical well formed by a hub 57 which extends from central portion 51 of diaphragm 52.

Preferably a filter 55 is provided in the fluid path. Filter 55 is preferably replaceable. In the preferred embodiment, inlet 16 is connected to an annular chamber 67 which surrounds valve seat structure 54. Filter 55 is located in chamber 67. Filter 55 is in the form of a ring which surrounds valve seat structure 54. Preferably, filter 55 is perforated by holes 55A so that flow through filter 55 in an axial direction is less restricted than flow through filter 55 in a radial direction. This permits filter 55 to act as a relatively coarse filter for the large volume of fluid which flows along the fluid path between inlet 16 and outlet 18 when valve 50 is open. Filter 55 acts as a very fine filter to any fluid flowing through filter 55 in a radial direction. As noted below, finely filtered fluid which has passed in a radial direction through filter 55 may be used to supply pilot fluid to control chamber 24.

FIG. 3A shows valve 50 in a closed configuration. In FIG. 3A, a pilot valve 30 is configured to provide high pressure fluid to control chamber 24. In this configuration, pilot valve 30 places chamber 24 in fluid communication with inlet 16. The high pressure fluid in chamber 24 holds diaphragm 52 against valve seat 54C thereby blocking the fluid path between inlet 16 and outlet 18.

When pilot valve 30 is configured as shown in FIG. 3A, fluid from inlet 16 is connected to chamber 24 by way of an orifice 58, a one-way valve 40, and a flow resistance chamber 60. Orifice 58 receives fluid which has passed radially through filter 55. The fluid connection then extends to input port 34 of 3-way pilot valve 30 through pilot input conduit 62. Pilot valve 30 connects the fluid to control port 20 of valve 50 via pilot port 32 and pilot control conduit 64.

Valve 50 can be caused to open by moving pilot valve 30 from the configuration of FIG. 3A to the configuration of FIG. 3B. In the configuration of FIG. 3B, pilot valve 30 connects control port 20 of valve 50 to outlet 18 of valve 50 by way of pilot output conduit 66 and one way valve 68. When valve 50 is closed the fluid pressure in inlet 16 will be much higher than the fluid pressure in outlet 18. Therefore, when the fluid pressure within chamber 24 is permitted to decrease to match the pressure of output 18, the fluid pressure in inlet 16 can push diaphragm 52 off of valve seat 54C thereby allowing fluid to flow along the path from inlet 16 to outlet 18 through valve 50. As diaphragm 52 is lifted off of valve seat 54C some fluid is forced out of chamber 24 through pilot control conduit 64. The pressure of fluid against diaphragm 52 continues to open diaphragm 52 against the bias force exerted by spring 56 until valve 50 is fully open. The fully open position of valve 50 may be the position, for example, when hub 57 hits the top of control chamber 24.

Valve 50 can be returned to its closed configuration by returning pilot valve 30 to the configuration of FIG. 3A. When this has been done a small amount of fluid can flow into orifice 58 thereby increasing fluid pressure within chamber 24 and driving diaphragm 52 into contact with valve seat 54. Spring 56 helps to move diaphragm 52 toward valve seat structure 54.

Figure 4:
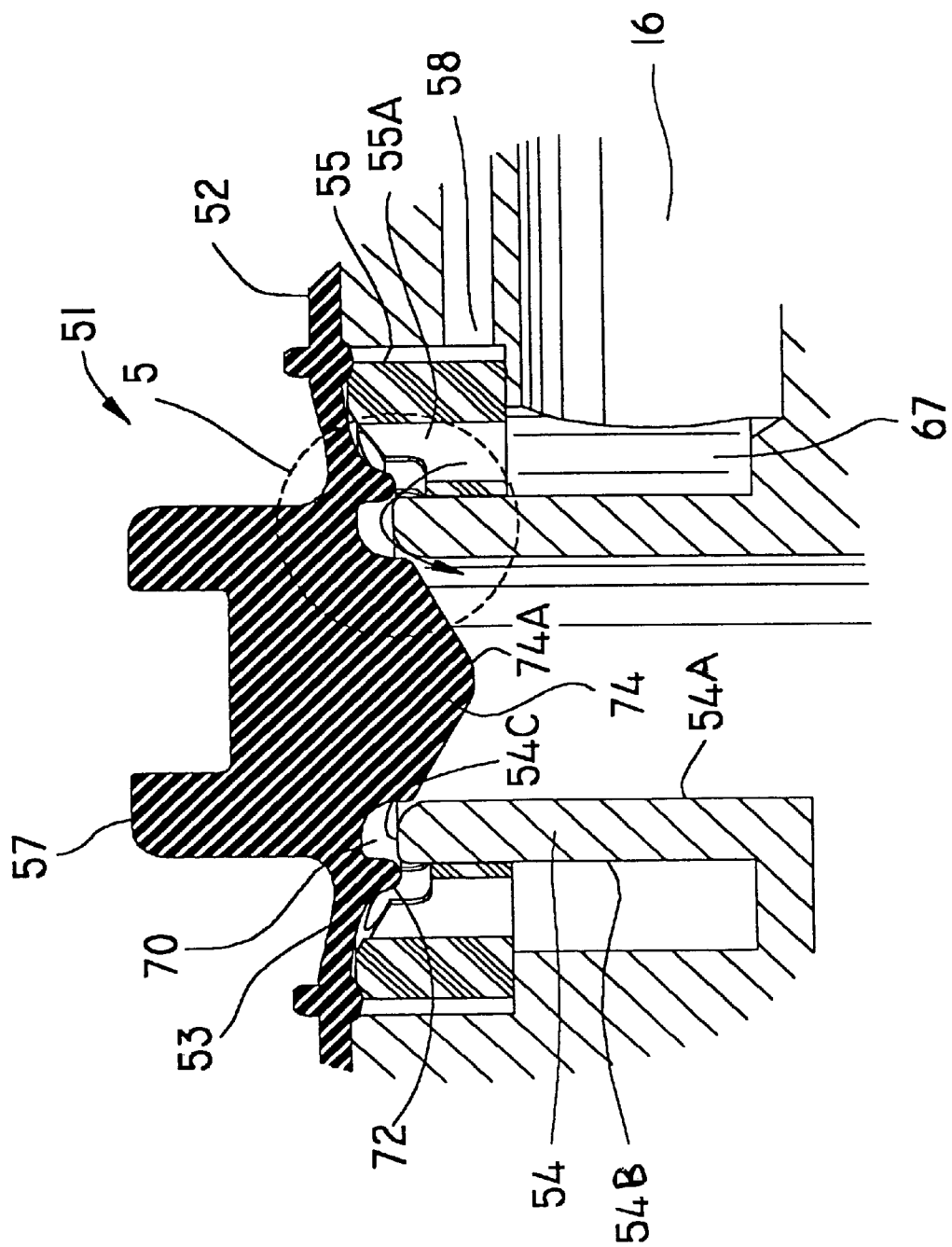
FIG. 4 is a fragmentary sectional view of a portion of the valve of FIGS. 3A and 3B in a partially closed configuration.

As seen best in FIG. 4, valve seat structure 54 preferably comprises an annular seating surface 54C on an upwardly projecting cylindrical ring having cylindrical inner and outer walls 54A and 54B. Valve seat 54C projects toward central portion 51 of diaphragm 52. The inventors have discovered that the shape of the portion of diaphragm 52 which interacts with valve seat structure 54 is important in reducing resonance in valve 50 during opening or closure of valve 50 The shape of valve seat structure 54 and central portion 51 can also reduce the likelihood that water hammer will occur on closure of valve 50.

Diaphragm 52 comprises an annular groove 70 which is concentric with valve seat structure 54. Groove 70 is defined between a collar 72 and a plug or "flow guide" 74. As central portion 51 of diaphragm 52 approaches valve seat structure 54 valve seat 54C enters groove 70. As this happens, the flow of fluid through valve 50 is reduced because of the limited clearance between inner and outer walls 54A and 54B of valve seat structure 54 and the inner and outer walls of groove 70.

Figure 5:
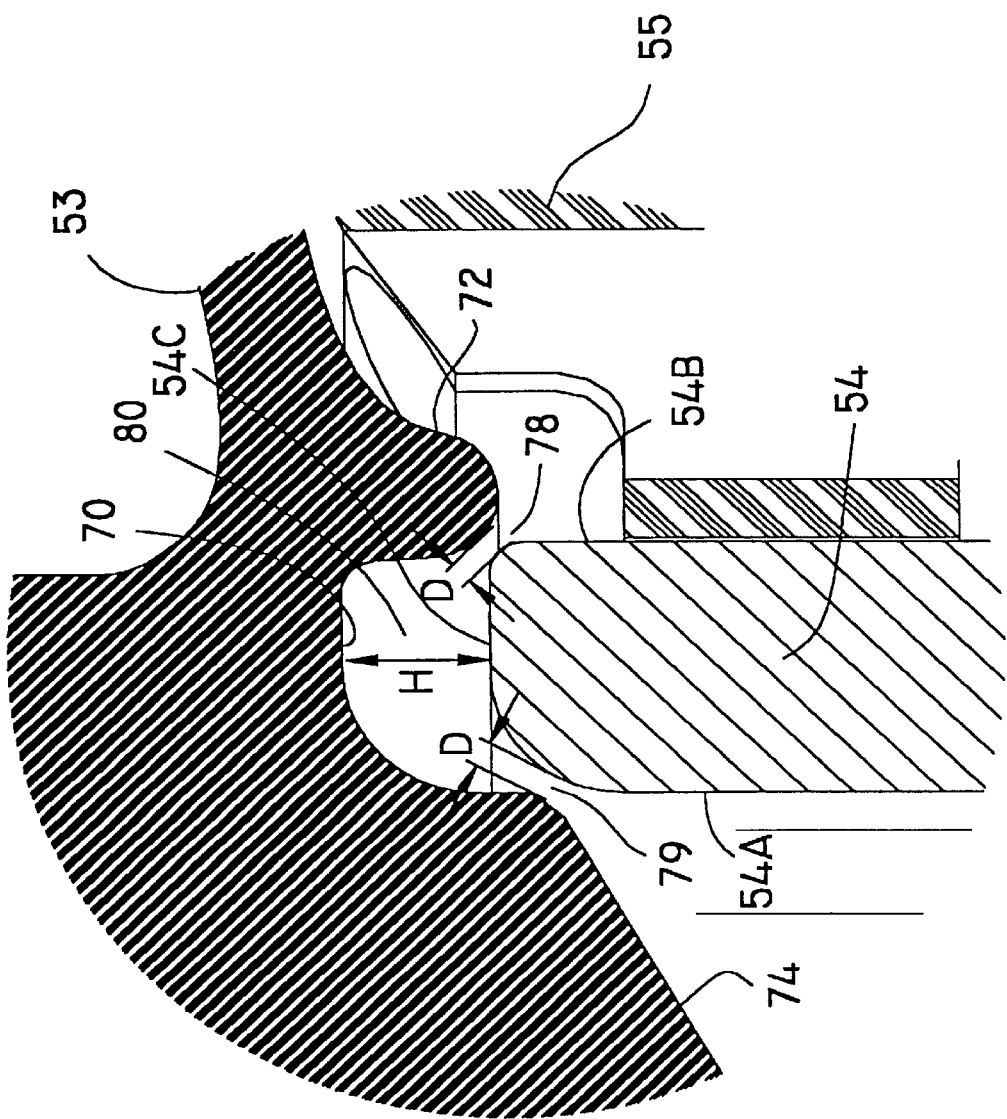
FIG. 5 is an enlarged fragmentary sectional view of an area of the valve of FIG. 4 surrounding the valve seat.

As shown in FIG. 5, groove 70 and valve seat structure 54 are dimensioned so that, when central portion 51 is in an intermediate position on its trajectory between its open and closed positions, valve seat 54C is entering groove 70, valve 50 is not closed, and there is a first annular zone of constriction 78 between collar 72 and outer wall 54B and a second annular zone of constriction 79 between plug 74 and inner wall 54A. In zones 78 and 79, there is relatively high fluid flow velocity because the cross sectional area of the fluid flow path is reduced in zones 78 and 79. Consequently, the fluid pressure within zones 78 and 79 will be reduced. Groove 70 is deep enough that at the same time as fluid pressure is reduced in zones 78 and 79, there is an annular stagnation zone 80 inside groove 70 and adjacent valve seat 54C.

The surfaces of central portion 51 and valve seat structure 54 which bound zones 78 and 79 are not oriented perpendicularly to the trajectory of central portion 51 but are preferably oriented substantially parallel to the trajectory so that the component of the net force on central portion 51 arising from reduced fluid pressures within zones 78 and 79 which is directed to pull central portion 51 along its trajectory toward its closed position is reduced.

The fluid pressure within stagnation zone 80 is larger than the pressures in zones 78 or 79 because the cross sectional area of the fluid flow path in stagnation zone 80 is significantly larger than it is in either of zones 78 or 79. This causes fluid to flow more slowly in zone 80 and causes the fluid pressure in zone 80 to be increased.

By shaping the central portion 51 of diaphragm 52 as described above to create a relatively high pressure stagnation zone 80 between valve seating surface 54C and diaphragm 52 the invention reduces the tendency for diaphragm 52 to close suddenly against valve seating surface 54C. The inventors have determined that it is particularly advantageous to dimension groove 70 and valve seat structure 54 so that when valve seat structure 54 enters groove 70 the height H of stagnation zone 80 is more than twice as large as the width D1 or D2 of the narrower one of constriction zones 78 and 79.

Plug 74 preferably has a generally conical end. It has been found that fashioning the end portion 74A of plug 74 as a cone with a cone angle θ of less than 60 degrees, and most preferably with a cone angle in the range of about 30 degrees to about 60 degrees is most effective at reducing valve closure noise. Some of the benefits of providing a conical end on plug 74 could be obtained by providing plug 74 with a chamfered edge portion which enters valve seat structure 54 as valve 50 is closing.

Figure 6B:
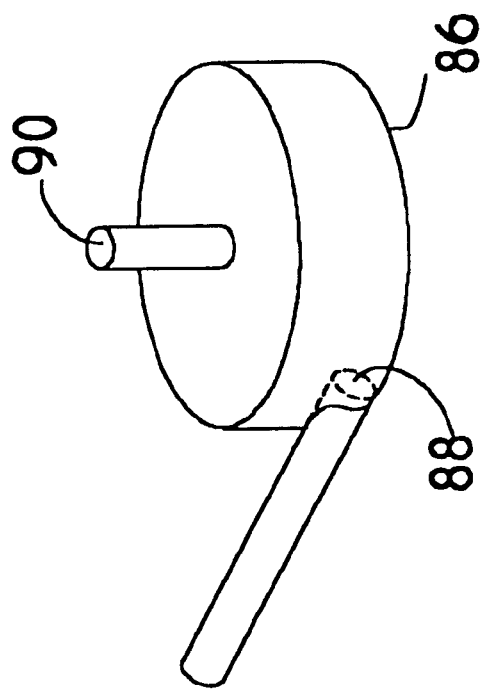
FIG. 6B shows an alternative embodiment of a fluid resistance chamber for use in the invention.
Figure 6A:
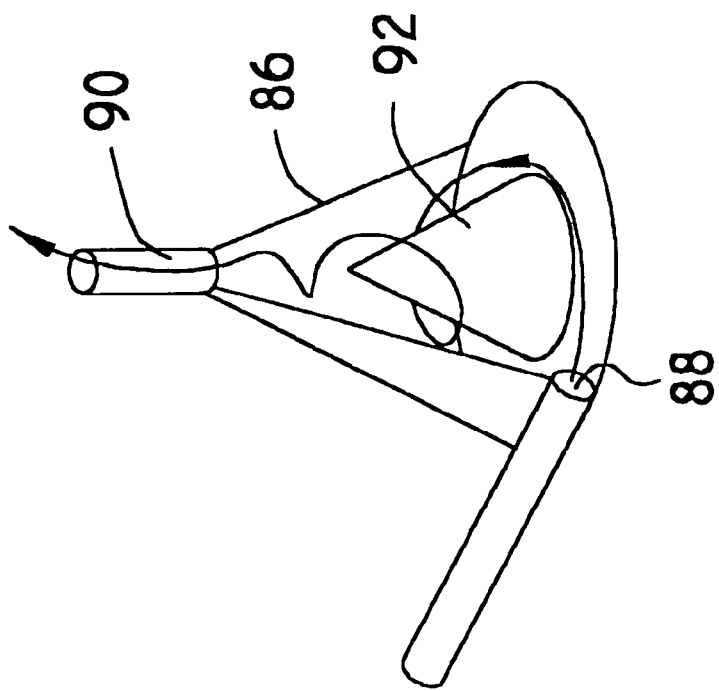
FIG. 6A shows a preferred embodiment of fluid resistance chamber for use in a valve according to the invention.

The possibility of creating a water hammer on closing valve 50 is further reduced by the inclusion of a flow resistance chamber 60 (FIG. 3A) between inlet 16 and chamber 24. Flow resistance chamber 60 comprises a chamber 86 (FIG. 6A) having an inlet and an outlet arranged so as to provide flow resistance. As shown in FIGS. 6A and 6B, flow resistance chamber 60 preferably comprises a generally circular chamber 86 having a tangentially directed fluid input 88 located at a peripheral edge of chamber 86 and a fluid outlet 90 near the center of chamber 86. It is believed that this arrangement promotes the formation of a vortex in chamber 86. Only fluid with relatively low kinetic energy may escape through outlet 90. As a result, fluid flow through chamber 86 cannot be suddenly established. If a pressure differential occurs between the input 88 and outlet 90 of chamber 86 then flow from input 88 to outlet 90 builds up only slowly. The presence of flow resistance chamber 60 further slows closure of valve 50 so that water hammer and resonances are significantly reduced or eliminated. A similar effect could be obtained by providing a narrow orifice in the fluid path between inlet 16 and chamber 24. Such a narrow orifice would be prone to clogging, however.

As shown in FIG. 6A, chamber 86 is preferably conical and fluid input 88 is located near a base portion of chamber 86 while fluid output 90 is located near the apex of chamber 86. Most preferably a conical insert 92 projects axially into chamber 86. Conical insert 92 most preferably has a base diameter of at least 40% of a base diameter of chamber 86. Flow resistance chamber 60 is preferably located between inlet 16 and inlet control tube 62 as shown in FIGS. 3A and 3B. Flow resistance chamber 60 could be located anywhere in the pilot fluid path between inlet 16 and chamber 24 to good effect. The flow resistance chamber 60 shown in FIG. 6B is a non-preferred alternative to the embodiment of FIG. 6A.

In most applications only a very small amount of fluid flows into or out of control port 20 of valve 50 as valve 50 is opened and closed. Thus the dimensions of the fluid path between orifice 58 and control port are typically small. As even small particles of sediment or the like could interfere with the flow of fluid to control port 20 it is preferable to filter any fluid before it can enter this fluid path. In the illustrated embodiment, fluid must flow radially from chamber 67 through filter 55 before entering orifice 58. As noted above, this can provide fine filtering for the fluid entering orifice 58 by the same replaceable filter 55 as is used to provide coarser filtering of fluid flowing through valve 50.

Figure 7:
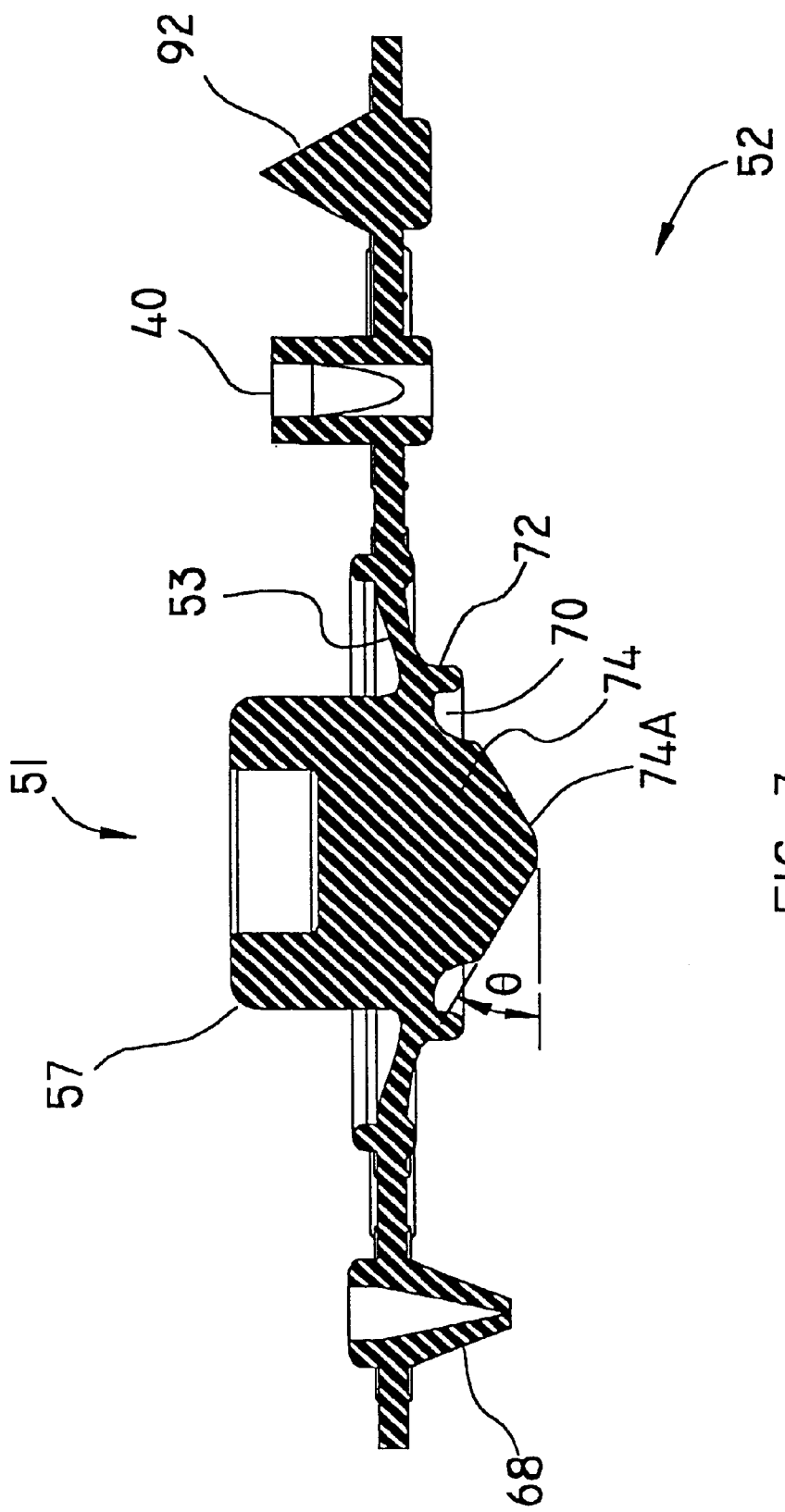
FIG. 7 is a section through a diaphragm for use in the valves of FIGS. 3A and 3B.

As shown in FIGS. 2 and 7, valve 50 can be conveniently constructed so that diaphragm 52 is clamped between a first housing 50A and a second housing 50B. One way valves 40 and 68, conical insert 92, hub 57, collar 72 and plug 74 can all be incorporated into diaphragm 52 which may be made as a unitary part as shown best in FIGS. 2 and 7. Valve 50 thus can be made with only five main parts.

As will be apparent to those skilled in the art in the light of the foregoing disclosure, many alterations and modifications in addition to those discussed above are possible in the practice of this invention without departing from the spirit or scope thereof. For example, the basic concept of creating a high pressure stagnation zone 80 between a valve seat and a freely moving valve member may be used to slow the closing of the valve member at an earlier stage than is shown in the preferred embodiment depicted herein.

Although it is preferred, stagnation zone 80 is not necessarily between the same two surfaces which seal against one another when valve 50 is closed. The invention could be practised by providing a separate set of sealing surfaces either upstream or downstream from stagnation zone 80.

While the valve has been described as including a groove 70 which provides annular constriction zones on both sides of valve seat structure 54, some advantages of the invention could be obtained by providing a constriction zone on only one side of valve seat structure 54. For example, plug 74 could be made narrow, or eliminated, so that only one constriction zone 78 is formed between collar 72 and outer wall 54B of valve seat structure 54. In the further alternative, collar 72 could be spaced away from outer wall 54B, or eliminated, so that only a single constriction zone 79 is formed between plug 74 and inner wall 54A of valve seat structure 54.

While inner wall 54A and outer wall 54B of valve seat 54 have been illustrated as being cylindrical and parallel to one another this is not necessary for the practice of the invention. Some deviation is permitted. The shape of plug 74 may be varied. If plug 74 has a conical end portion then the angle of the end portion may vary. Although it is not preferred, plug 74 may have a flat end portion. In some less preferred embodiments of the invention, plug 74 could be omitted entirely.

While valve 50 has been described as including a filter 55, it is not necessary that there be a filter in every embodiment of valve 50. In some cases the fluid passing through valve 50 may be very clean. In other cases a filter may be provided upstream from valve 50. Other configurations of filter are possible where a filter is incorporated into valve 50. While there are distinct advantages in providing a single filter that filters fluid passing through the valve relatively coarsely and filters pilot fluid more finely, the pilot fluid need not flow through the filter radially as described above. The pilot fluid could flow through the filter in a non-radial direction which is different from the direction of the larger passages provided for fluid flowing through the valve. The filter need not be annular but may have other shapes or configurations as well. For example, the filter could be provided in the form of a cylindrical plug in an inlet chamber (not shown) of valve 50 which presents relatively coarse filtering to fluids passing longitudinally through itself and relatively fine filtering to fluids passing transversely. Separate filters could be provided to filter the portion of fluid flowing through the valve and pilot fluid.

While the pilot valve which is connected to operate valve 50 is described as a three-way valve (i.e. a valve having a port which can selectively be placed in fluid communication with one of two other ports), a two-way valve (i.e. a valve having two ports which can selectively be either placed in fluid communication with one another or disconnected from one another) may also be used as a pilot valve. This may be done by connecting inlet 16 to chamber 24 in a way which permits fluid to flow along a fluid path from inlet 16 into chamber 24 at a limited rate. For example, inlet 16 may be connected to chamber 24 by a channel which includes a flow restricting orifice (or other constriction), a flow restricting chamber 60, or both an orifice (or other constriction) and a flow restricting chamber. A two-way valve is connected between outlet 18 and chamber 24. When the two-way valve is open, the fluid path between chamber 24 and outlet 18 through the two-way valve is significantly less restrictive than the fluid path between inlet 16 and chamber 24.

When the two-way valve is closed, fluid flows into chamber 24 from inlet 16 until the fluid pressure within chamber 24 is sufficient to close valve 50. When the two-way valve is open, the fluid pressure within chamber 24 is reduced. Although fluid continues to flow from inlet 16 into chamber 24 through the channel, the flow rate through the channel is insufficient to raise pressure in chamber 24 to a level such that valve 50 closes or remains closed when the two-way valve is open. An advantage of this configuration is that a two-way pilot valve is simpler in construction than a three-way pilot valve. Furthermore, if the pilot valve is located in a separate housing from valve 50 only two tubes need to extend between the pilot valve and valve 50. A disadvantage of this configuration is that the constant flow of fluid through chamber 24 when valve 50 is open may cause any filter(s) in the channel between inlet 16 and chamber 24 to become plugged more rapidly than would otherwise happen.

B. Pilot Valve

The inventors have determined that resonances can occur in valve 50 if pilot valve 30 has an intermediate position wherein ports 32, 34 and 36 are all in fluid communication with one another. Pilot valve 30 is preferably constructed so that it has no such intermediate position and yet can be switched very quickly between the configurations of FIGS. 3A and 3B. Preferably pilot valve 30 should be constructed in a manner which avoids the wear problems associated with prior art sliding spindle valves. Preferably pilot valve 30 is of a type which can be actuated with a light touch on an actuator member which has a very short travel.

Figure 8:
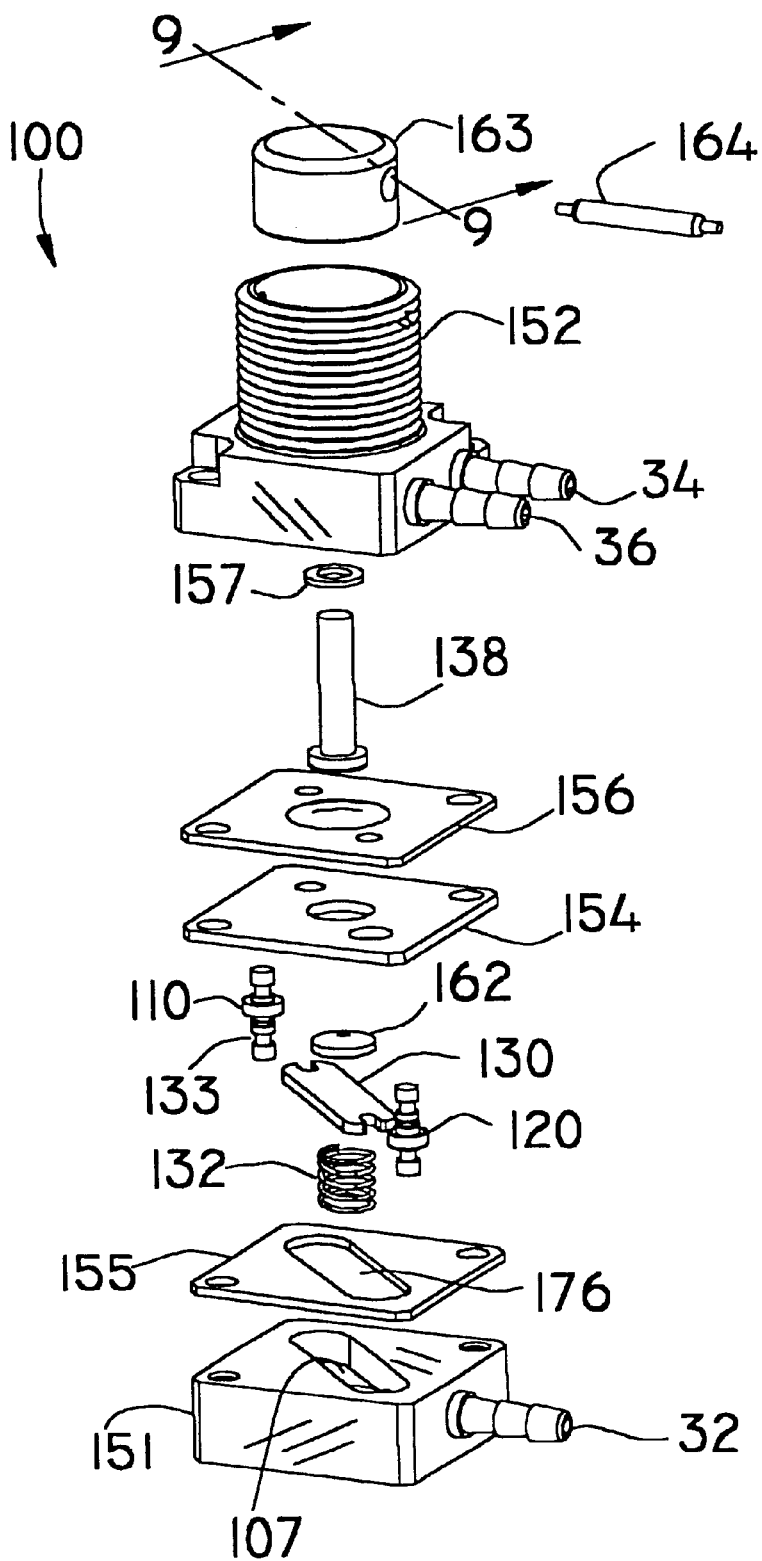
FIG. 8 is an exploded view of a 3-way pilot valve for use in a preferred embodiment of the invention.
Figure 9:
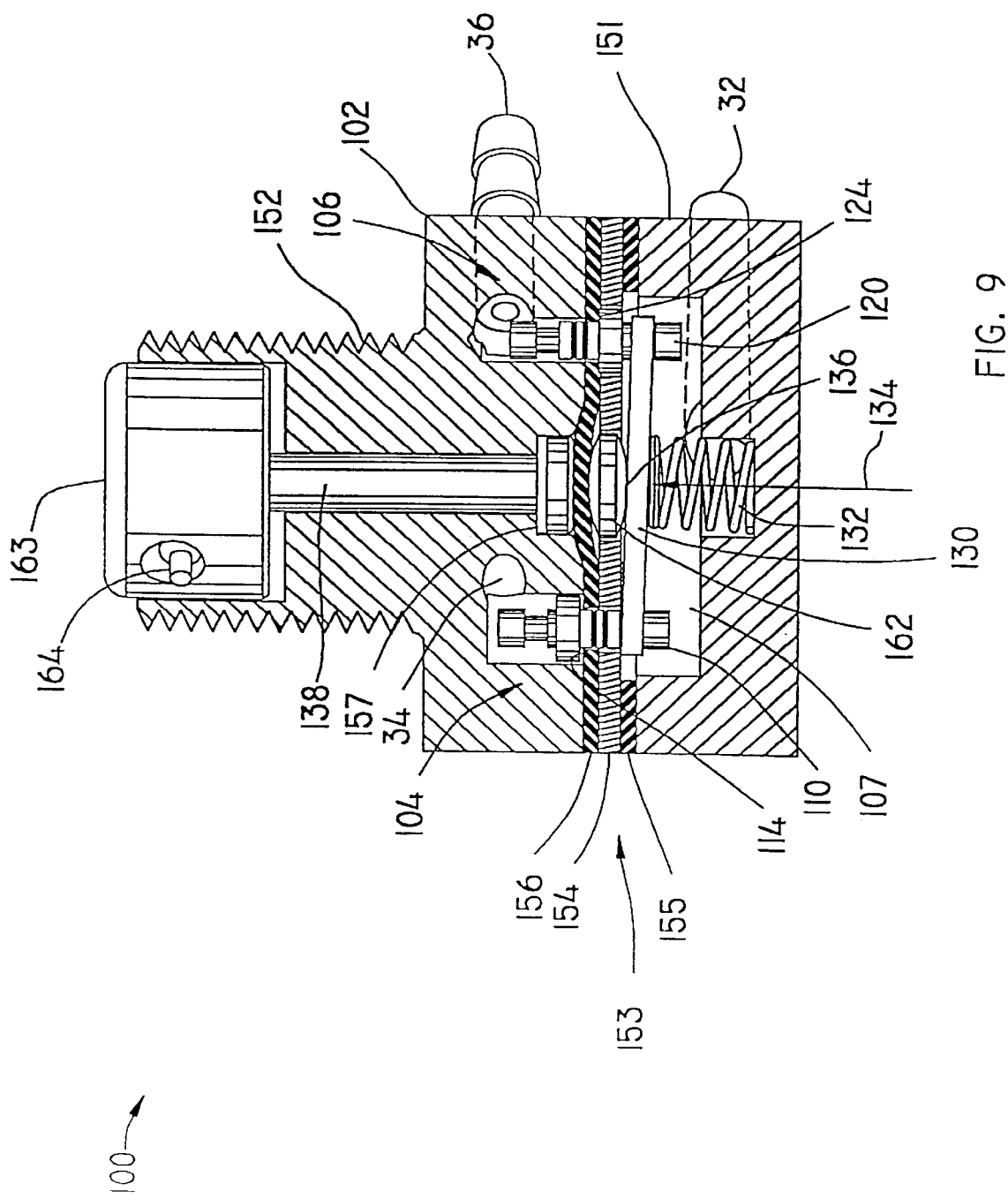
FIG. 9 is a section through the pilot valve of FIG. 8 in the plane 9—9.

FIGS. 8, and 9 show views of a pilot valve 100 according to the invention. Pilot valve 100 is preferably used in a system together with a valve 50 as described above but may also be used in any application where a 3-way pilot valve is needed. Pilot valve 100 comprises a valve body 102. An inlet valve 104 and an outlet valve 106 lie within body 102. Inlet valve 104 connects an inlet port 34 to a common or "pilot" port 32. Outlet valve 106 connects an outlet port 36 to common port 32. In the preferred embodiment, inlet valve 104 and outlet valve 106 both open into a chamber 107. Common port 32 communicates with chamber 107.

Pilot valve 100 comprises a mechanism for selectively either closing inlet valve 104 and then opening outlet valve 106 or closing outlet valve 106 and then opening inlet valve 104. The mechanism takes advantage of fluid pressure differentials which exist between the ports in pilot valve 100 when pilot valve 100 is in use. When a pilot valve 100 is connected to a valve system as shown, for example, in FIG. 1, fluid pressure at inlet port 34 is typically significantly higher than the fluid pressure at outlet port 36 and the fluid pressure at common port 32 comes to static equilibrium with the fluid pressure at the port to which common port 32 is connected.

Inlet valve 104 comprises a valve member 110 which carries a sealing surface 112 capable of sealing against a valve seat 114. Sealing surface 112 may include an undercut, as shown in FIG. 11B to promote good sealing against a valve seat. Inlet port 104 is constructed so that fluid pressure tends to keep inlet valve 104 closed as long as fluid pressure is higher at inlet port 34 than it is at common port 32. In the illustrated embodiment, valve member 110 is a spindle and the sealing surface is the face of a flange 116. When inlet valve 104 is closed, so that inlet port 34 is not in communication with common port 32.

Outlet valve 106 also comprises a movable valve member 120 having a sealing surface 122 which can bear against a valve seat 124 to close output valve 106. Sealing surface 122 may also include an undercut, as shown in FIG. 11B to promote good sealing against valve seat 124. Outlet valve 106 is constructed so that fluid pressure tends to keep outlet valve 106 closed as long as fluid pressure is higher at common port 32 than it is at outlet port 36. In the illustrated embodiment valve member 120 comprises a spindle and sealing surface 122 is a face of a flange 125 on the spindle.

Valve members 110 and 120 are linked by a rocker arm 130. Preferably, valve members 110 and 120 are pivotally attached at opposing ends of arm 130. In the preferred embodiment, rocker arm 130 comprises a member having longitudinal slots 131 at each of its ends. The slots engage grooves 133 in valve members 110 and 120. Valve members 110 and 120 are preferably identical for manufacturing reasons but may be different from each other. Rocker arm 130 preferably lies within chamber 107.

Figure 10B:
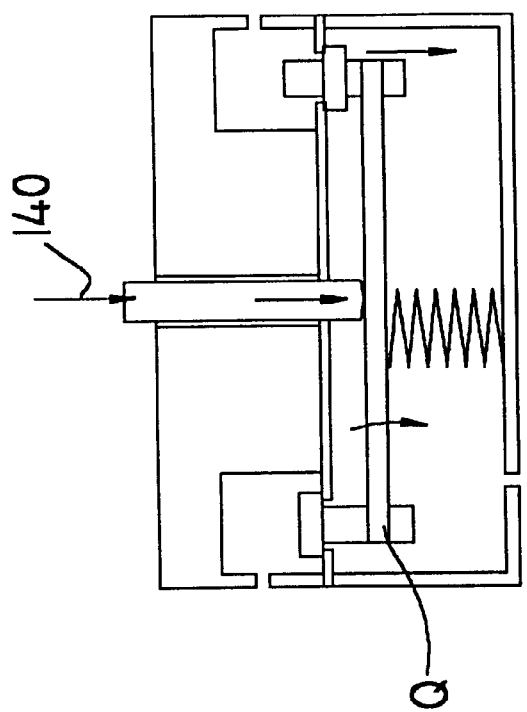
FIG. 10B is a schematic sectional view of a pilot valve showing an intermediate position of the pilot valve mechanism in which the inlet port and outlet ports are both closed.

Rocker arm 130 bears against a movable fulcrum 136. A bias means urges a central portion of rocker arm 130 in the direction of arrow 134 against fulcrum 136. The bias means is illustrated as a coil spring 132. In the illustrated embodiment, fulcrum 136 is on a contact member 162 which can be moved by longitudinal displacement of an actuator or plunger 138. Plunger 138 may be displaced between a first position, as shown in FIG. 10A and a second position, as shown in FIG. 10C, to operate pilot valve 100.

Figure 10A:
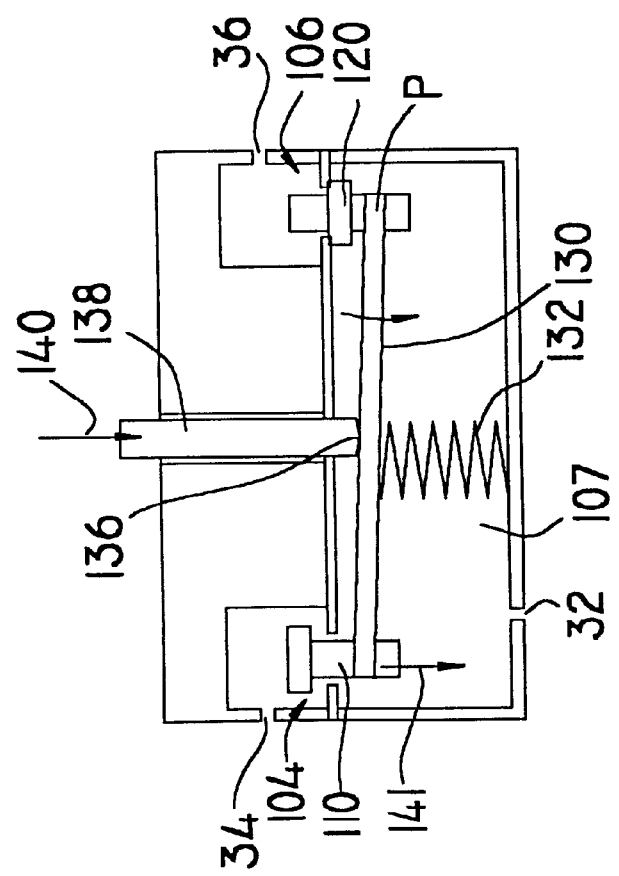
FIG. 10A is a schematic sectional view of a pilot valve in which the inlet port is connected to a common port and the outlet port is closed.
Figure 10D:
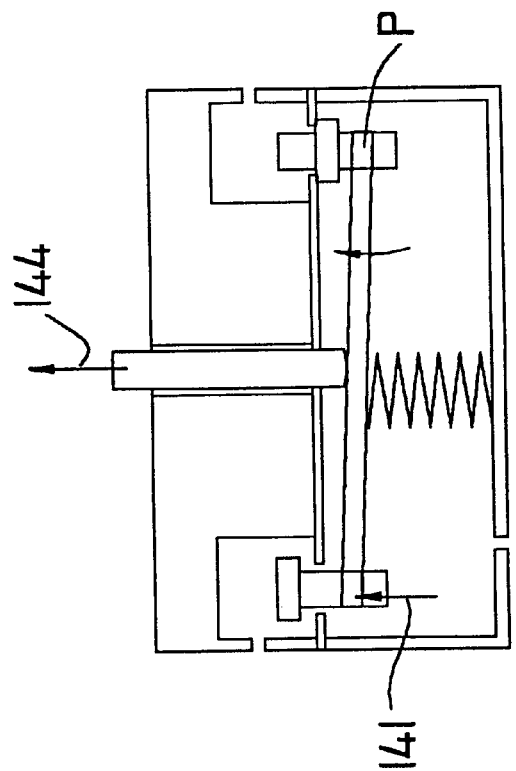
FIG. 10D shows the return to the rest condition of the pilot valve in which the inlet port is opened.
Figure 10C:
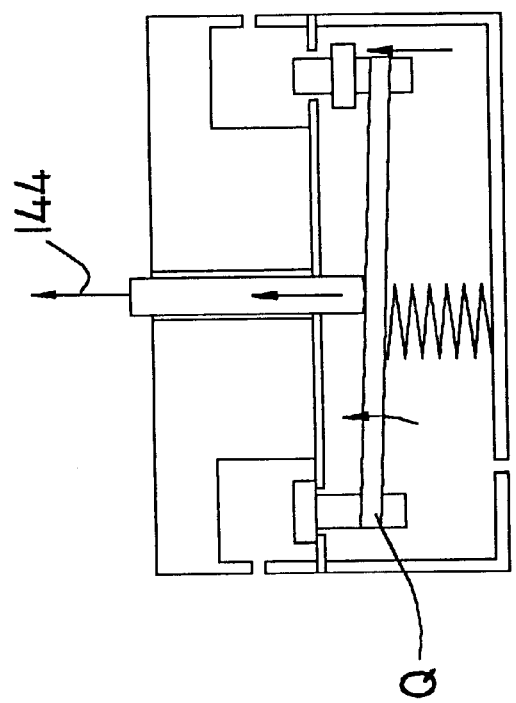
FIG. 10C is a schematic sectional view of a pilot valve with its outlet port connected to its common port and its inlet port closed.

When plunger 138 is in its "rest" position, as shown in FIG. 10A, rocker arm 130 holds valve member 110 of inlet valve 104 in its fully "open" position. Spring 132 pushes valve member 120 of outlet valve 106 so that outlet valve 106 is closed. Inlet port 34 is in communication with outlet port 32 through the open inlet valve 104. The fluid pressure within chamber 107 is the same as the fluid pressure at inlet port 34 and is greater than the fluid pressure at outlet port 36. This pressure differential acts on valve member 120 of outlet valve 106 and helps to hold valve member 120 in its "closed" position.

A user operates pilot valve 100 by pushing plunger 138 in the direction indicated by arrow 140. As this happens, fulcrum 136 pushes on rocker arm 130 which pivots about point P (FIG. 10A). This causes valve member 110 to move in the direction of arrow 141 toward its closed position.

When valve member 110 reaches its closed position, as shown in FIG. 10B, the fluid pressure within chamber 107 is still about the same as the fluid pressure at inlet port 34. Outlet valve 106 remains closed. Continued motion of plunger 138 in the direction of arrow 140 causes rocker arm 130 to pivot about point Q (FIG. 10B). Rocker arm 130 then pulls outlet valve 106 open. When outlet valve 106 opens, the fluid pressure in chamber 107 falls to match the pressure at outlet port 36.

If plunger 138 is in its second position (as shown in FIG. 10C) and then released then spring 132 pushes rocker arm 130 and plunger 138 in the direction of arrow 144. As this occurs, inlet valve 104 is held closed by the pressure differential across valve member 110. Rocker arm 130 pivots about point Q until valve member 120 of outlet valve 106 is in its closed position. The force of spring 132 on rocker arm 130 then breaks valve member 110 free from its seat, thereby opening inlet valve 104, pressurizing chamber 107 to the pressure at inlet port 34 and returning pilot valve 100 to its "rest" configuration.

Those skilled in the art will understand that there are many ways in which a pilot valve 100 could be constructed. In the preferred embodiment shown in the drawings valve 100 has a first housing 151 which contains chamber 107 and a second housing 152 which houses plunger 138. The first and second housings together form a valve body. A backup seal 157 may be provided to prevent any fluid leakage along plunger 138.

First and second housings 151 and 152 lie on either side of a 3-layered structure 153 comprising a diaphragm 156, a sealing plate 154 and a gasket 155. Diaphragm 156 and gasket 155 are typically composed of elastomer materials and preferably are reinforced with internal cloth reinforcement or other means to enhance their wear characteristics. Sealing plate 154 is composed of a material with good stiffness and with good corrosion resistance such as a metal or stiff plastic. The preferred material for plate 154 in most applications is stainless steel or brass.

Valve seats 114 and 124 are defined by apertures which extend through structure 153 in an inlet chamber 172 and an outlet chamber 170 respectively. Inlet chamber 172 and outlet chamber 170 are formed in second housing 152. The apertures may be conveniently made as round holes which are concentric with a cylindrical inlet chamber 172, and a cylindrical outlet chamber 170 respectively. A third hole in plate 154 receives a rocker arm contact member 162.

Longitudinal motion of plunger 138 is transmitted through diaphragm 156 to contact member 162 which transmits motion of plunger 138 to rocker arm 130. Contact member 162 may be a separate piece or may be integral with rocker arm 130. In the further alternative, contact member 162 could be an end portion of plunger 138 which projects through an aperture in diaphragm 156 and is sealed to diaphragm 156 to prevent leakage of fluid from chamber 107. A slot 176 in gasket 155 exposes the three holes in plate 154 and provides clearance for rocking motion of rocker arm 130.

Plunger 138 is provided with an actuator member which a user can move to displace plunger 138. The actuator member may be, for example, an actuator button 163 on an end of plunger 138 away from rocker arm 130. In the illustrated embodiment a locking pin 164 holds actuator button 163 in place on plunger 138.

There are many alternative ways in which plunger 138 could be moved at the urging of an operator. For example, plunger 138 could be connected to a toggle lever, a foot pedal, or the like.

Figure 12:
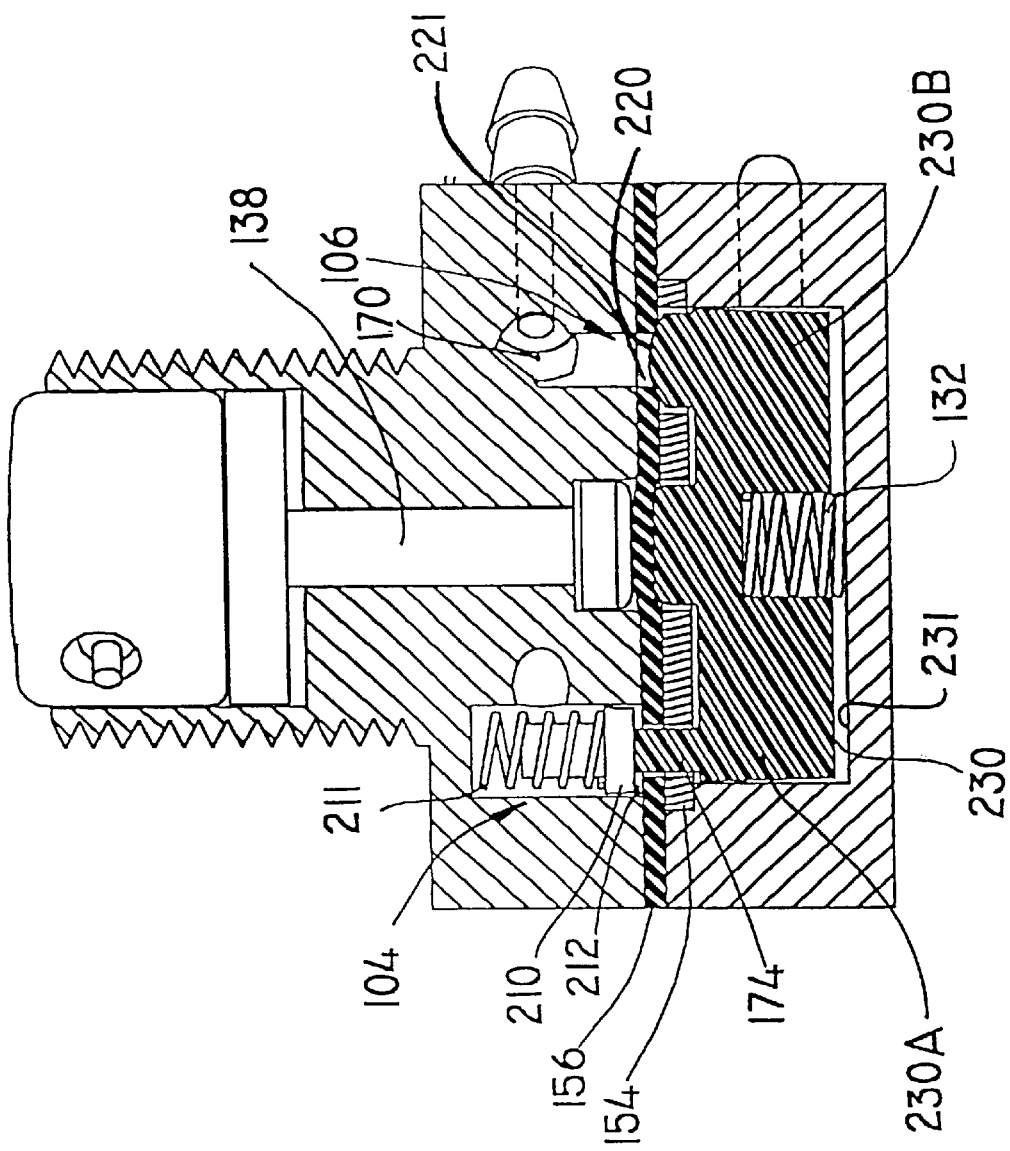
FIG. 12 shows a 3-way pilot valve according to an alternative embodiment of the invention.

FIG. 12 shows a pilot valve according to an alternative embodiment of the invention. In the embodiment of FIG. 12, inlet valve 104 comprises a valve member 210 having a sealing surface 212 which is biassed against valve seat 114 by a spring 211. Rocker member 230 has one end 230A which bears a projection 174 capable of lifting valve member 210 off of valve seat 114 and another end 230B.

The valve member of outlet valve 106 comprises a spherical projection 220 on second end 230B of rocker member 230. Rocker member 230 is biassed by spring 132 so as to hold projection 220 against a valve seat 221. Thus, outlet valve 106 is initially closed and inlet valve 104 is open. When a user depresses plunger 138 then a central portion of rocker arm 230 is pushed downwardly against spring 132. Because the pressure within chamber 107 is higher than the pressure within outlet chamber 170 spherical projection 220 is held to its valve seat 221 and outlet valve 106 is held closed. Since nothing is holding end 230A of rocker arm 230, end 230A can move downwardly while spherical projection 220 pivots in its valve seat 221 while outlet valve remains closed. As this happens, spring 211 biases inlet valve 104 closed. Eventually further movement of end 230A is blocked by a lowermost wall 231 of chamber 107. Continued downward movement of plunger 138 then pulls spherical projection 220 out of its valve seat 221 thereby opening outlet valve 106. When plunger 138 is released then the sequence which occurs upon depressing plunger 138 is reversed.

As a further alternative to the embodiment of FIG. 12, outlet valve 106 may be constructed in substantially the same manner as the outlet valve 106 of FIGS. 8 and 9.

As will be apparent to those skilled in the art in the light of the foregoing disclosure, many alterations and modifications are possible in the design of pilot valve 100 and/or in the construction of a fluid control system using a valve 50 and a pilot valve 100 without departing from the spirit or scope of this invention. Some such modifications and alterations are discussed above. Others are also possible.

A fluid control system according to the invention may include a diaphragm valve according to the invention, such as valve 50 which is described above. The diaphragm valve is preferably be controlled by a 3-way pilot valve, such as pilot valve 100, but may also be controlled by any other 3-way valve suitable for use as a pilot valve. Similarly, a pilot valve according to the invention is preferably used to control a diaphragm valve 50 according to the invention but may also be used to control other types of diaphragm valve.

Plunger 138 may be replaced with any actuator means capable of moving rocker arm 130 in the direction of arrow 140 of FIG. 11A. For example, a cable or arm may be provided to pull rocker arm 130 in the direction of arow 140 against the force exerted by spring 132. Plunger 138 could be replaced with a pivotally mounted arm having one end connected to move rocker arm 130 when the arm pivots. Many other actuator means may also be used within the scope of the invention.

Spring 132 may be replaced with any other bias means suitable for urging rocker arm 130 toward the position of FIG. 11A. The bias means may comprise a coil spring, a leaf spring, or the like. The bias means need not act in the center of rocker arm 132. The bias means does not need to be directly opposed to fulcrum 136.

Valve members 110 and 120 need not comprise spindles but may comprise flaps, balls or other valve members connected to or coupled to a rocker arm 130 which operates substantially as described above.

Accordingly, the scope of the invention is to be construed in accordance with the substance defined by the following claims.

We claim:
1. A fluid control valve comprising:

a) a body having an inlet, an outlet and a fluid path extending between the inlet and the outlet;

b) a chamber in the body the chamber in fluid communication with a control port;

c) a valve member movably disposed within the body for motion toward or away from a valve seat along a trajectory, the valve member having a closed position wherein the valve member is sealed against the valve seat and the fluid path is blocked by the valve member and an open position wherein the fluid path is not blocked by the valve member, the valve member movable toward the closed position along the trajectory by increasing a fluid pressure within the chamber;

wherein, when the valve member is in an intermediate position between its open and closed positions, the fluid path extends through a first constriction zone between the body and a surface on the valve member which is oriented substantially parallel to the trajectory, through a stagnation zone between the body and a surface on the valve member which extends substantially transversely to the trajectory, and through a second constriction zone between the body and a surface on the valve member which is oriented substantially parallel to the trajectory, where the stagnation zone provides a cross-sectional area in the fluid path at least twice as large as a cross sectional area provided by the first constriction zone and at least twice as large as a cross sectional area provided by the second constriction zone.

2. The valve of claim 1 wherein the constriction zones are annular.

3. The valve of claim 1 wherein the valve comprises a diaphragm and the valve member is on the diaphragm.

4. The valve of claim 3 wherein the valve seat is on a valve seat structure comprising an annular seating surface surrounding a central aperture and the fluid path extends through the aperture.

5. The valve of claim 4 wherein the valve member comprises a plug portion, the plug portion received within the aperture when the valve member is in its closed position, and the first constriction zone comprises an annular constriction between the plug portion and an inner wall of the aperture.

6. The valve of claim 3 wherein the seating surface is on a rim of a valve seat structure projecting toward the valve member and the valve member comprises a collar, the collar receiving the valve seat structure when the valve member is in its closed position wherein a second constriction zone comprising an annular constriction between the collar and an outer wall of the valve seat structure exists when the valve member is in an intermediate position between its open and closed positions.

7. The valve of claim 6 wherein, the stagnation zone is between the valve member and the seating surface, and flanked by the constriction zones when the valve member is in an intermediate position between its open and closed positions.

8. The valve of claim 5 wherein an end portion of the plug portion has a conical configuration.

9. The valve of claim 8 wherein the end portion of the plug has a cone angle in the range of 30 to 60 degrees.

10. A fluid control valve comprising:

a) a body having an inlet, an outlet and a fluid path extending between the inlet and the outlet;

b) a chamber in the body, the chamber in fluid communication with a control port;

c) a valve member movably disposed within the body for free motion toward or away from a valve seat along a trajectory, the valve member having a closed position wherein the valve member is sealed against the valve seat and the fluid path is blocked by the valve member and an open position wherein the fluid path is not blocked by the valve member, the valve member movable toward the closed position along the trajectory by increasing a fluid pressure within the chamber;

d) an annular filter in the fluid path, the filter located in an annular chamber surrounding the valve seat structure;

wherein, the valve seat is on a valve seat structure comprising an annular seating surface surrounding a central aperture, the fluid path extends through the aperture and, when the value member is in an intermediate position between its open and closed positions, the fluid path extends through a first constriction zone between the body and a surface on the valve member which is oriented substantially parallel to the trajectory and through a stagnation zone between the body and a surface on the value member which extends substantially transversely to the trajectory.

11. A fluid control value comprising:
 a) a body having an inlet, an outlet and a fluid path extending between the inlet and the outlet;
 b) a chamber in the body in fluid communication with a control port;
 c) a valve member movably disposed within the body for free motion toward or away from a valve seat along a trajectory, the valve member having a closed position wherein the valve member is sealed against the valve seat and the fluid path is blocked by the valve member and an open position wherein the fluid path is not blocked by the value member, the valve member movable toward the closed position along the trajectory by increasing a fluid pressure within the chamber;
 d) a flow restriction chamber in the body, the flow restriction chamber comprising a substantially tangential inlet in a peripheral portion of the chamber, the flow restriction chamber inlet in the fluid communication with the valve inlet, and an outlet in a central portion of the flow restriction chamber, the outlet capable of being placed in fluid communication with the chamber in the body;
wherein, when the valve member is in an intermediate position between its open and closed positions, the fluid path extends through a first constriction zone between the body and a surface on the valve member which is oriented substantially parallel to the trajectory and through a stagnation zone between the body and a surface on the valve member which extends substantially transversely to the trajectory.

12. The valve of claim 11 wherein the flow restriction chamber is substantially conical, the flow restriction chamber inlet is near a base portion of the flow restriction chamber and the flow restriction chamber outlet is in an apex portion of the flow restriction chamber.

13. The valve of claim 12 comprising a conical insert portion extending axially into the flow restriction chamber from the base portion.

14. The valve of claim 13 in combination with a 3-way pilot valve, the pilot valve having an inlet port communicating with the fluid control valve inlet through a pilot fluid path, an outlet port in fluid communication with the fluid control valve outlet, and a pilot port in fluid communication with the control port of the fluid control valve, the pilot valve having a first configuration wherein its inlet and pilot ports are in fluid communication and a second configuration wherein its outlet and pilot ports are in fluid communication.

15. The valve of claim 10 in combination with a 3-way pilot valve, the pilot valve having an inlet port communicating with the fluid control valve inlet through a pilot fluid path, an outlet port in fluid communication with the fluid control valve outlet, and a pilot port in fluid communication with the control port of the fluid control valve, the pilot valve having a first configuration wherein its inlet and pilot ports are in fluid communication and a second configuration wherein its outlet and pilot ports are in fluid communication.

16. The valve and pilot valve combination of claim 15, the fluid path passing through larger passages extending in a first direction in the filter and the pilot fluid path passing through smaller passages extending in a second direction through the filter.

17. The valve and pilot valve combination of claim 16 wherein the first direction is a substantially axial direction and the second direction is a substantially radial direction.

18. The valve and pilot valve combination of claim 15 comprising a flow restriction chamber in the pilot fluid path, the flow restriction chamber comprising a substantially tangential inlet in a peripheral portion of the chamber and an outlet in a central portion of the chamber.

19. The valve and pilot valve combination of claim 18 wherein the flow restriction chamber is substantially conical, the inlet is near a base portion of the flow restriction chamber and the outlet is in an apex portion of the flow restriction chamber.

20. The valve and pilot valve combination of claim 19 comprising a conical insert portion extending axially into the flow restriction chamber from the base portion.

21. The valve and pilot valve combination of claim 20 wherein the conical insert portion has a base diameter of 40% or more of a base diameter of the flow restriction chamber.

22. The valve and pilot valve combination of claim 15 wherein the pilot valve comprises:
 a) a body,
 b) a first valve member movably disposed within the body, the first valve member having an open position wherein the inlet and pilot ports are in fluid communication and a closed position wherein the inlet and pilot ports are not in fluid communication, the first valve member arranged so that it is held in its closed position when a fluid pressure at the inlet port is higher than a fluid pressure at the pilot port;
 c) a second valve member movably disposed within the body, the second valve member having an open position wherein the outlet and pilot ports are in fluid communication and a closed position wherein the outlet and pilot ports are not in fluid communication the second valve member arranged so that it is held in its closed position when a fluid pressure at the pilot port is higher than a fluid pressure at the outlet port;
 d) a rocker arm in the body;
 e) a spring biasing the rocker arm against the first and second valve members, the spring holding the rocker arm in a position wherein the first valve member is in its open position and the second valve member is in its closed position; and,
 f) an operating member for displacing the rocker arm into a position wherein the first valve member is in its closed position and the second valve member is in its open position.

23. The valve and pilot valve combination of claim 22 wherein the second valve member is pivotally coupled to the rocker arm.

24. The valve and pilot valve combination of claim 23 wherein the first valve member is pivotally coupled to the rocker arm.

25. The valve of claim 1 in combination with a two-way pilot valve connecting the chamber and the outlet, the pilot valve having an open state wherein the chamber is in fluid communication with the outlet through the pilot valve and a closed state wherein fluid cannot freely flow from the chamber to the outlet, the valve comprising a pilot fluid passage communicating between the chamber and the inlet, the pilot fluid passage providing significantly more restriction to fluid flow than the pilot valve in its open state.

26. A valve comprising:
   a) a valve body having an inlet, an outlet, a valve seat structure between the inlet and the outlet and fluid path extending between the inlet and the outlet through an aperture in the valve seat structure, the valve seat structure comprising generally cylindrical inner and outer walls and an annular valve seating surface;
   b) a diaphragm comprising a movable valve member portion, the valve member portion located between the valve seat structure and a cavity in the housing, the valve member portion comprising an annular groove capable of receiving the valve seating surface; and,
   c) a fluid passage in the body through which fluid may be introduced to the cavity to vary a fluid pressure within the cavity;
wherein the valve member portion has a closed position wherein fluid flow along the fluid path is blocked by the valve member portion, an open position wherein fluid can flow along the fluid path from the input to the output, and an intermediate position wherein a first constriction zone in the fluid path is defined between the inner wall of the valve seat structure and an inner wall of the groove and a second constriction zone in the fluid path is defined between the outer wall of the valve seat structure and an outer wall of the groove, and a stagnation zone is defined in the groove adjacent the valve seating surface, a cross sectional area of the fluid path being significantly greater in the stagnation zone than in each of the first and second constriction zones.

27. The valve of claim 26 wherein the inner wall of the groove is on a plug projecting from the diaphragm, the plug having a conical end portion.

28. The valve of claim 26 comprising a spring in the chamber, the spring located to bias the valve member portion against the valve seating surface.

29. The valve of claim 26 comprising an annular chamber surrounding the valve seat structure, the annular chamber in fluid communication with the inlet.

30. The valve of claim 29 comprising an annular filter within the annular chamber.

31. The valve of claim 30 wherein, when the valve member is in an intermediate position between its open and closed positions, the fluid path extends through a second constriction zone between the body and a surface on the valve member which is oriented substantially parallel to the trajectory, where the stagnation zone provides a cross-sectional area in the fluid path at least twice as large as a cross sectional area provided by the first constriction zone and at least twice as large as a cross sectional area provided by the second constriction zone.

32. The valve of claim 31 wherein, when the valve member is in an intermediate position between its open and closed positions, the fluid path extends through a second constriction zone between the body and a surface on the valve member which is oriented substantially parallel to the trajectory, where the stagnation zone provides a cross-sectional area in the fluid path at least twice as large as a cross sectional area provided by the first constriction zone and at least twice as large as a cross sectional area provided by the second constriction zone.

33. The valve of claim 32 comprising a flow restriction chamber in the body, the flow restriction chamber comprising a substantially tangential inlet in a peripheral portion of the chamber, the flow restriction chamber inlet in fluid communication with the valve inlet, and an outlet in a central portion of the flow restriction chamber, the outlet capable of being placed in fluid communication with the chamber in the body.

34. The valve of claim 33 wherein, when the valve member is in an intermediate position between its open and closed positions, the fluid path extends through a second constriction zone between the body and a surface on the valve member which is oriented substantially parallel to the trajectory, where the stagnation zone provides a cross-sectional area in the fluid path at least twice as large as a cross sectional area provided by the first constriction zone and at least twice as large as a cross sectional area provided by the second constriction zone.

35. The valve of claim 34 in combination with a 3-way pilot valve, the pilot valve having an inlet port communicating with the fluid control valve inlet through a pilot fluid path, an outlet port in fluid communication with the fluid control valve outlet, and a pilot port in fluid communication with the control port of the fluid control valve, the pilot valve having a first configuration wherein its inlet and pilot ports are in fluid communication and a second configuration wherein its outlet and pilot ports are in fluid communication.

36. The valve of claim 35 wherein, when the valve member is in an intermediate position between its open and closed positions, the fluid path extends through a second constriction zone between the body and a surface on the valve member which is oriented substantially parallel to the trajectory, where the stagnation zone provides a cross-sectional area in the fluid path at least twice as large as a cross sectional area provided by the first constriction zone and at least twice as large as a cross sectional area provided by the second constriction zone.

37. The valve of claim 36 in combination with a 3-way pilot valve, the pilot valve having an inlet port communicating with the fluid control valve inlet through a pilot fluid path, an outlet port in fluid communication with the fluid control valve outlet, and a pilot port in fluid communication with the control port of the fluid control valve, the pilot valve having a first configuration wherein its inlet and pilot ports are in fluid communication and a second configuration wherein its outlet and pilot ports are in fluid communication.

38. The valve and pilot valve combination of claim 12 wherein the pilot valve comprises:
   a) a body,
   b) a first valve member movably disposed within the body, the first valve member having an open position wherein the inlet and pilot ports are in fluid communication and a closed position wherein the inlet and pilot ports are not in fluid communication, the first valve member arranged so that it is held in its closed position when a fluid pressure at the inlet port is higher than a fluid pressure at the pilot port;
   c) a second valve member movably disposed within the body, the second valve member having an open position wherein the outlet and pilot ports are in fluid communication and a closed position wherein the outlet and pilot ports are not in fluid communication the second valve member arranged so that it is held in its closed position when a fluid pressure at the pilot port is higher than a fluid pressure at the outlet port;

d) a rocker arm in the body;

e) a spring biasing the rocker arm against the first and second valve members, the spring holding the rocker arm in a position wherein the first valve member is in its open position and the second valve member is in its closed position; and, f) an operating member for displacing the rocker arm into a position wherein the first valve member is in its closed position and the second valve member is in its open position.

39. The valve and pilot valve combination of claim 38 wherein the second valve member is pivotally coupled to the rocker arm.

40. The valve and pilot valve combination of claim 39 wherein the first valve member is pivotally coupled to the rocker arm.

* * * * *